May 6, 1924.
P. B. LASKEY
METHOD OF MAKING CANDY
Filed Aug. 20, 1921
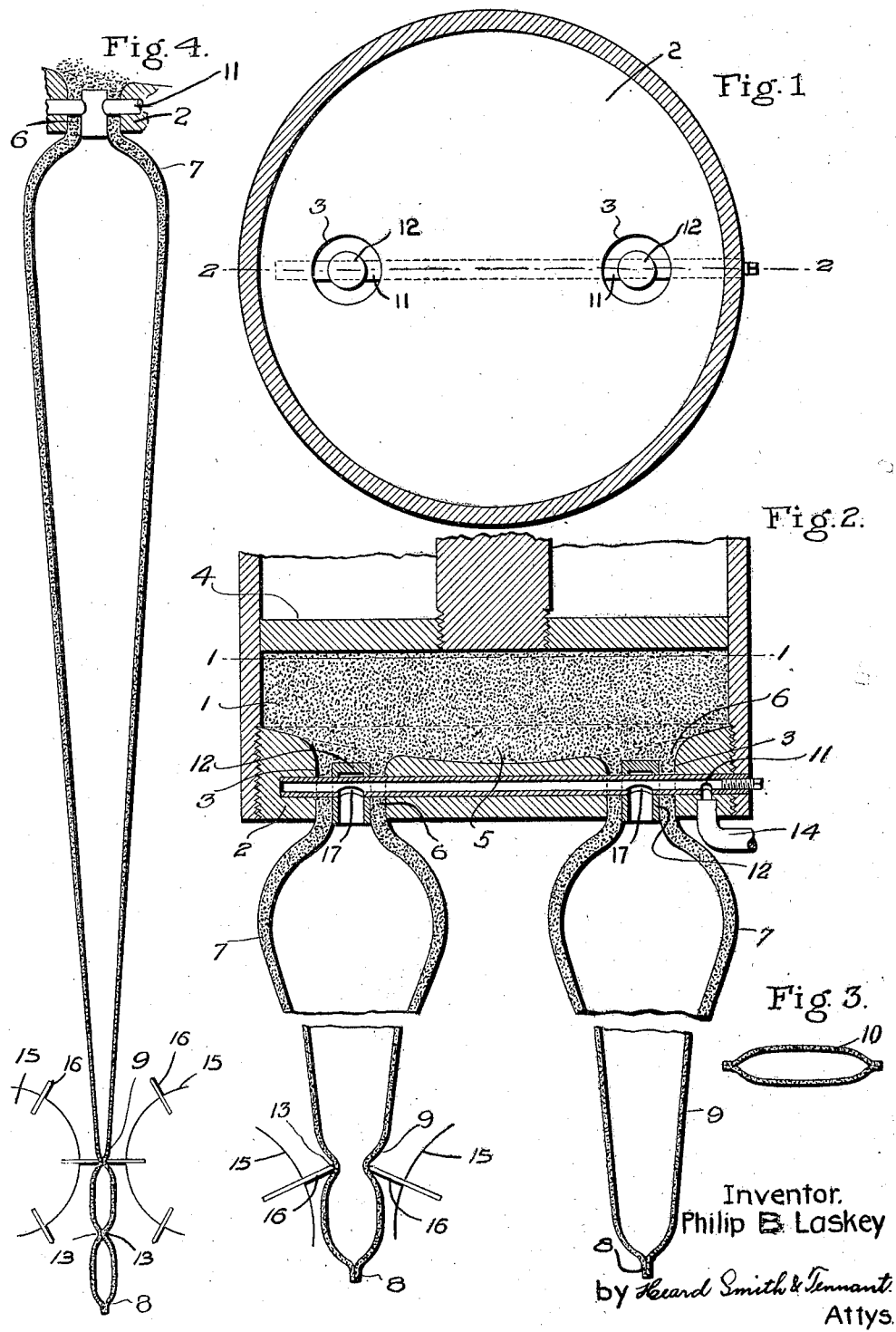
Inventor.
Philip B. Laskey
by Heard, Smith & Tennant
Attys.

Patented May 6, 1924.

1,492,600

UNITED STATES PATENT OFFICE.

PHILIP B. LASKEY, OF MARBLEHEAD, MASSACHUSETTS.

METHOD OF MAKING CANDY.

Application filed August 20, 1921. Serial No. 493,889.

*To all whom it may concern:*

Be it known that I, PHILIP B. LASKEY, a citizen of the United States, and resident of Marblehead, county of Essex, State of Massachusetts, have invented an Improvement in Methods of Making Candy, of which the following description, in connection with the accompanying drawing, is a specification, like characters on the drawing representing like parts.

This invention relates to a method of making candy and particularly to a method of making candy of that type in which each piece of candy is hollow.

It has heretofore been proposed to make candy of this kind by forcing the candy material through a die having an annular opening so that the candy will be delivered therefrom in the form of a tube and then cutting the tube into suitable lengths, the operation of cutting the tube closing the ends of each length so as to produce the desired hollow pieces of candy. It is a desideratum in candy of this type that the walls of the short tubular length should be relatively thin but it is very difficult to force the candy material through an annular opening which is as narrow as the desired thickness of the walls of the completed candy because of the fact that the candy material is very thick and tenacious. My invention provides novel means for manipulating the candy material which greatly facilitates the making of the tubular candy.

In accordance with my invention I force the candy material through the die in the form of a tube with relatively thick walls, the walls of the tube being much thicker than that desired for the finished candy. As this tube of candy with thick walls is delivered from the die I subject it to internal pressure which expands it radially thus increasing its diameter, this operation resulting in simultaneously thinning the walls of the tube. The expanded tube with thin walls is then drawn out or elongated longitudinally, thereby both reducing the diameter of the tube to that desired for the finished candy and at the same time still further thinning the walls so as to reduce them to a proper dimension.

The internal pressure by which the tube with thick walls is expanded radially thereby partially thinning the walls may be obtained by delivering air under pressure to the interior of the tube as it is delivered from the die, such compressed air operating to expand the tube evenly in all directions.

In carrying out my process the candy is forced through the die so that it issues in the form of a tube with thick walls and the desired air pressure is delivered into the interior of the tube and the latter is at the same time drawn out or pulled longitudinally. When the material issues from the die it is sufficiently soft so that the interior air pressure will expand it radially thus partially thinning the walls. The pulling of the candy tube in the direction of its length operates to elongate it thereby reducing its diameter and still further thinning the walls, and when it has been pulled to the desired size it is cut into lengths, the operation of cutting each length closing the tube together at the point of separation.

As soon as the candy material leaves the die it commences to cool. The cooling operation is facilitated by the thinning of the walls so that after the candy has been expanded radially and the walls have been thinned then it becomes cool or set to such an extent that it will not further expand by internal pressure. It can, however, be pulled longitudinally thus reducing its diameter. Hence the internal pressure will be operative to expand that part of the tube only which is adjacent to and emerging from the die and the presence of the internal pressure does not interfere with the operation of pulling the candy to reduce its diameter.

In order to give an understanding of my invention I have illustrated in the drawings an apparatus by which the method may be carried out and which will now be described.

Fig. 1 is a section on the line 1—1, Fig. 2.

Fig. 2 is a section on the line 2—2, Fig. 1.

Fig. 3 shows in section a piece of candy made in accordance with my improved method.

Fig. 4 is a fragmentary view showing the operation of making candy in accordance with my invention.

As stated above my method consists in extruding the candy material through a die having an annular opening, so that the candy material will be delivered in the form of a tube, said opening having a width considerably greater than the desired thickness of the walls of the candy so that the tube of candy material which emerges from the die will have relatively thick walls, and then subjecting said tube with thick walls to internal pressure which expands it radially thereby partially thinning the walls and simultaneously drawing the tube longitudinally to further thin the walls and reduce the tube to the desired size.

To illustrate this process I have shown in the drawings an extruding machine comprising a container 1 adapted to receive candy material 5 having its end 2 in the form of a die which is provided with an annular aperture 3 through which the candy material is extruded. The candy material may be forced through the aperture 3 in any suitable way and I have herein illustrated a plunger 4 operating in the container 1 for this purpose, it being understood that such mechanical elements are shown merely to illustrate the operation of the process. When the candy material 5 is forced through the aperture 3 it will be delivered therefrom in the form of a tube 6 which has relatively thick walls, said walls being considerably thicker than that desired for the finished candy. As the tube 6 of candy emerges from the die it is subjected to internal pressure while it is still soft such pressure operating to expand the tube 6 radially to form a tube of much larger dimension as shown at 7. This expanding of the tube radially results in automatically thinning the walls of the tube so that the walls of the tubular portion 7 of large diameter are considerably thinner than the walls of the tubular portion 6. This internal pressure can conveniently be provided for by introducing air under pressure into the candy tube. The diametrical dimension of the tubular portion 7 is much larger than that desired for the finished candy and this diameter is then reduced by pulling the tubular candy in the direction of its length. During this pulling operation the end of the tube will be closed as shown at 8 so as to retain the air pressure therein. The pulling of the tube in the direction of its length operates both to elongate the tube and thus reduce its diameter and at the same time to thin its walls so that the end portion 9 of the tube is reduced to the proper diameter and has the desired thin wall. As the tube is thus brought to the proper dimensions it is cut into lengths thereby to produce the individual pieces 10 of candy such as shown in Fig. 3, each piece being a short length of tubing with closed ends.

The candy may be cut by any suitable means and I have herein illustrated diagrammatically a device for this purpose which is used quite commonly in candy factories and which comprises two rotating elements 15 having blades 16 that operate on opposite sides of the candy and close the sides together and also indent them sufficiently so that the pulled candy may be readily broken at the indentations to form the separate pieces 10.

The compressed air may be delivered to the interior of the candy tube in various ways without departing from the invention. In the construction herein shown the die 2 has a tubular member 11 extending transversely thereof and the latter supports a tubular core 12 which occupies the aperture 3, said core forming with the walls of the aperture the annular passage through which the tube 6 of candy is forced. The tubular member 11 is shown as extending transversely through the core 12 thereby supporting it and said tubular member is provided with a port 17 which communicates with the interior of the core 12. A pipe 14 leading to a source of compressed air supply communicates with the tubular member 11 to supply compressed air thereto. The air pressure which is used will be so gauged as to expand the candy tube to the desired amount.

The operation of the device will be readily understood. The candy material is forced through the annular aperture 3 and at the same time air under pressure is forced through the tubular member 11 and tubular core 12. The end of the candy tube is closed thus confining the air therein and the air pressure acts on the interior of the candy tube at the point where it emerges from the die and thereby expands said candy tube more or less depending upon the amount of air pressure. The candy tube is pulled continuously in the direction of its length thereby elongating and reducing its diameter from the size shown at 7 to that shown at 9 which is the desired size for the finished candy. This pulling operation results in still further thinning the walls of the candy and as the candy is brought to the desired size it is acted upon by the device 15, 16 which closes the walls of the tube against each other at separated intervals and forms the indentations 13 where the length of candy is broken into small pieces.

As the candy issues from the die it is still soft and will readily expand to the larger diameter but as this expansion takes place and the walls of the candy are thinned, the candy will cool sufficiently so that it will resist any further expanding pressure and therefore notwithstanding the fact that the entire length of candy is subjected to the same internal pressure it will expand radially only at the upper end just as it emerges from the die. The pulling operation results in reducing the diameter notwithstanding the internal pressure and consequently thinning the walls.

I have shown in the drawings a die having a plurality of apertures 3 so that a plurality of tubes of candy may be extruded simultaneously.

In carrying out the process it is simply necessary to force the candy material through the aperture 3 and deliver compressed air to the interior of the tube 6 and simultaneously draw the tube longitudinally until it is reduced to the desired size and then cut the tube into lengths.

I claim:

1. The steps in the method of making candy which consists in extruding candy material through an annular opening which is of sufficient width so that said candy material will be extruded freely, subjecting the tube thus formed to sufficient internal pressure as it leaves said opening to increase the diameter of the tube and thereby reduce the thickness of the walls thereof, and then pulling the enlarged tube longitudinally thereby to reduce its diameter and still further reduce the thickness of the walls.

2. The steps in the method of making candy which consists in extruding candy material through an annular opening which is of sufficient width so that said candy material can be extruded freely subjecting the tube thus formed to sufficient internal pressure as it leaves said opening to cause the diameter of the tube to be increased and the walls to be reduced in thickness, and then pulling the enlarged tube longitudinally thereby to still further reduce the thickness of the walls and to reduce the interior diameter of the tube to a dimension less than that which the tube had as it emerged from said opening.

In testimony whereof, I have signed my name to this specification.

PHILIP B. LASKEY.